United States Patent Office 2,832,771
Patented Apr. 29, 1958

2,832,771

PRODUCTION OF ALPHA, ALPHA-DICHLORO-EPSILON-CAPROLACTAM FROM CYCLOHEXANONE OXIME

William C. Francis, Pittsburg, Kans., and James R. Thornton and Thomas R. Hopkins, Joplin, Mo., assignors to Spencer Chemical Company, a corporation of Missouri No Drawing. Application March 30, 1956
Serial No. 574,970

16 Claims. (Cl. 260—239.3)

This invention relates to the processes of producing chemical compounds. More particularly, this invention is concerned with novel processes of producing alpha, alpha-dichloro-epsilon-caprolactam of the formula

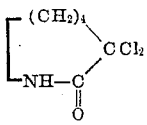

There is disclosed in a copending application Serial No. 574,968, filed March 30, 1956, an improved process for the production of alpha, alpha-dichloro-epsilon-caprolactam utilizing epsilon-caprolactam as the starting material. It has been found that a substantial economy in raw material costs is made possible through the practice of the present invention whereby the dichlorolactam is produced from cyclohexanone oxime. There is further provided by this invention a process which produces high yields of the desired dichlorolactam, and which process lends itself to a continuous operation.

It has been discovered according to the present invention that alpha, alpha-dichloro-epsilon-caprolactam may be produced by reacting cyclohexanone oxime with a suitable chlorinating agent followed by hydrolysis of the resulting reaction product. This reaction may be conveniently represented as follows:

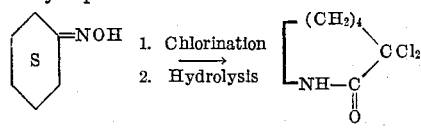

It is presumed that in this process an intermediate compound of indeterminate composition is formed first which is subsequently converted to alpha, alpha-dichloro-epsilon-caprolactam. The process is generally effected by reacting oxime and chlorinating agent at temperatures above 50° C. in the presence of an essentially anhydrous liquid reaction medium. The optimum reaction temperature is 80–85° C. The time required to substantially complete the reaction will vary although a period of 1–5 hours is considered sufficient under most conditions.

Examples of chlorinating agents convenient in the process are $PCl_5$, $PCl_3$, $POCl_3$, $SO_2Cl_2$, $SOCl_2$ employed individually, as mixtures thereof, or as a combination of the agent or mixture with $Cl_2$. The preferred chlorinating agent is $PCl_5$ or its equivalent combination of $PCl_3$ and $Cl_2$. Generally, stoichiometric amounts of oxime and chlorinating agent are employed since such ratio is the most efficient. Thus, in the case of $PCl_5$ a ratio of at least three moles are employed per mole of cyclohexanone oxime. By directly combining one mole of the oxime with at least three moles of $PCl_5$ higher yields are obtained of the product than if less than three moles of $PCl_5$ are present initially. Furthermore, by adding the oxime to the $PCl_5$, alone or in solution, even higher yields result. A substantial excess of chlorinating agent may be used if desired.

While it is not a strict requirement, the use of liquid reaction conditions is favored in order to more adequately control the heat of reaction, maintain the reactants in intimate contact and facilitate processing. It is essential that the solvent or liquid medium be substantially anhydrous and may consist of such inert organic materials as xylene, benzene, toluene, chloroform and carbon tetrachloride. The reaction medium should be liquid within the entire temperature range of the process.

When $PCl_5$ is used as the chlorinating agent, it has been found most convenient to use either or both of the by-products of the chlorination reaction as the reaction medium. Thus, the use of $PCl_3$ or $POCl_3$, or mixtures of these, minimizes the number of components involved in the process and simplifies the subsequent separation of components. $POCl_3$ and $PCl_3$ may be separated from the reaction product and recovered as a mixture, and if preferred, easily separated from each other by distillation and the $PCl_3$ converted to $PCl_5$ with $Cl_2$. Alternatively, the mixture may be treated first with chlorine to convert $PCl_3$ to $PCl_5$ and the $PCl_5$ and $POCl_3$ then separated by distillation or by fractional crystallization and the components recycled to the process as desired. If $POCl_3$ is intended as a reaction medium it is necessary that a continuous or periodic purge be employed to eliminate the excess of $POCl_3$ which would otherwise accumulate in the reactor and reduce the effective volume of the reactor.

Further increased yields of alpha, alpha-dichloro-epsilon-caprolactam are achieved in the practice of the above invention by mixing cyclohexanone oxime with a chlorinating agent at or below 35° C. Maintaining the temperature of the mixture at or below 35° C. until the reactants are thoroughly intermingled, largely avoids formation of undesirable side products which are not ultimately converted to alpha, alpha-dichloro-epsilon-caprolactam. This mixing operation is exothermic in nature and cooling means are usually required to maintain the temperature at or below 35° C. if the addition is to be consummated in a reasonable time. The higher yields which are accountable by such a procedure are favored by the lowest temperatures that one may most practically employ; and thus temperatures as low as minus 95° C. may be desirable. The low temperatures which may be used during the mixing operation impose a restriction upon the type of liquid which can be used as the solvent or reaction medium. The preferred process, that which introduces the minimum number of components, is apparent in the case of $PCl_3$ or $POCl_3$ media. The physical properties of $POCl_3$ (M. P. 2° C., B. P. 105.3° C.) permit its use over a wide range of temperatures.

When it is desired to mix cyclohexanone oxime with chlorinating agent at temperatures below the applicable range of $POCl_3$, we have discovered that the advantages of the $POCl_3$ system can be retained if $PCl_3$ is employed as the solvent during the mixing operation. The melting point of $PCl_3$ permits its use as low as —91° C. After the oxime and $PCl_5$ have been thoroughly intermingled in the presence of $PCl_3$, it is advantageous to add $POCl_3$ to the mixture since $PCl_3$ alone has a boiling point (75.5° C.) which is lower than the optimum temperature required for chlorination. A suitable mixture of $POCl_3$ and $PCl_3$ permits a chlorination temperature of 80–85° C. or higher. The addition of $POCl_3$ is conveniently effected at 20–30° C. The addition of $POCl_3$ does not comprise the introduction of an extraneous component since $POCl_3$ results as a by-product when $PCl_5$ is the chlorinating agent.

The mixture of cyclohexanone oxime, chlorinating agent and liquid reaction medium, after its preparation at or below 35° C., is next elevated to a temperature which is suitable to effect chlorination. Chlorination is generally effected at temperatures above 50° C., and preferably at 80-85° C., but the specific temperature used will depend upon the characteristics of the reactants and solvent. Usually one to five hours at such temperatures is sufficient to effect reaction.

Upon termination of this reaction the mixture is distilled to remove the solvent and volatile by-products. Reduced pressures facilitate the distillation.

The residue is hydrolyzed over ice or with an aqueous alkali, such as sodium carbonate. Alpha, alpha-dichloro-epsilon-caprolactam forms quickly and precipitates from the aqueous mixture. The product may be recovered by filtration and recrystalized from ligroin.

$PCl_3$ and $POCl_3$ from the process may be recovered and recycled for use in the subsequent conversion of additional quantities of cyclohexanone oxime to alpha, alpha-dichloro-epsilon-caprolactam.

Alpha, alpha-dichloro-epsilon-caprolactam may be converted to alpha-chloro-epsilon-caprolactam by the use of hydrogen with a catalyst such as palladium on charcoal and pressures of about 5 atm. at room temperature. The resulting alpha-chloro-epsilon-caprolactam may then be converted to lysine as shown in application Serial No. 574,967, filed March 30, 1956.

The following examples are intended for purposes of illustration and not to limit the scope of this invention as modifications will be obvious to those skilled in the art.

*Example 1*

A solution of 39.6 gm. (0.35 mole) of cyclohexanone oxime in 125 ml. of xylene was added dropwise to a stirred mixture of 156.3 gm. (0.75 mole) of $PCl_5$ in 500 ml. of xylene at 80-85° C. An additional 70.9 gm. (0.34 mole) of $PCl_5$ was added portionwise at 80-85° C. and the mixture stirred for 5 hours at 85° C. The hot solution was filtered and the filtrate distilled under reduced pressure to remove the solvent and volatile by-products. The residue was then hydrolyzed with aqueous sodium carbonate to produce alpha, alpha-dichloro-epsilon-caprolactam; M. P. 121-125° C.

The distillate may be fractionally distilled to separate the by-product $PCl_3$ which may be recycled directly for use as a chlorinating agent or it may be reacted with $Cl_2$ to form $PCl_5$ and the $PCl_5$ recycled.

*Example 2*

A solution of 56.6 gm. (0.5 mole) of cyclohexanone oxime dissolved in 200 ml. of xylene was added dropwise to a stirred solution of 312.6 gm. (1.5 moles) of $PCl_5$ in 1000 ml. of xylene at 80-85° C. The mixture was stirred at 80-90° C. for 4½ hours and distilled under reduced pressure to remove the solvent. Hydrolysis of the residue with aqueous sodium carbonate yielded 55.1 gm. of alpha, alpha-dichloro-epsilon-caprolactam; M. P. 118-123° C.; 60.6% yield.

*Example 3*

A solution of 56.6 gm. (0.5 mole) of cyclohexanone oxime in 200 ml. of xylene was added dropwise with stirring to a mixture of 312.6 gm. (1.5 moles) of $PCl_5$ in xylene held at 30-35° C. over a period of 25 minutes. After the addition was completed, the mixture was heated to 80° C. over a period of 30 minutes and continued at 80-85° C. for an additional 70 minutes. An insoluble precipitate was filtered off and the filtrate distilled under reduced pressure. The dark brown, oily residue was added with stirring to 50 gm. of sodium carbonate in 500 ml. of water from which 68.6 gm. of alpha, alpha-dichloro-epsilon-caprolactam precipitated; M. P. 119-123° C.; 75.4% yield.

*Example 4*

17 gm. (0.15 mole) of cyclohexanone oxime was added portionwise to a stirred slurry of 93.7 gm. (0.45 mole) of phosphorus pentachloride in 50 ml. of phosphorus oxychloride while cooling with an ice bath to maintain a temperature of about 5° C. The addition of the oxime required about 30 minutes. The reaction mixture was allowed to warm to room temperature and then heated to 96-99° C. for one hour.

The solvent was removed by distillation under reduced pressure, and the dark, oily residue hydrolyzed by addition to 400 ml. of cracked ice. The crystalline product was removed by filtration and a small additional amount of product obtained from the filtrate by neutralization with sodium carbonate. The combined product was washed with water and dried to yield 15.5 gm. of crude alpha, alpha-dichloro-epsilon-caprolactam, melting point 111-122° C. (This corresponds to a conversion of 57% to the crude product.)

*Example 5*

To a stirred slurry of 93.7 gm. (0.45 mole) of phosphorus pentachloride in 50 ml. of phosphorus trichloride was added 17.0 gm. (0.15 mole) of cyclohexanone oxime while cooling the reaction mixture to maintain a temperature of −10 to −20° C. The addition of the oxime was carried out over a period of about 35 minutes. The reaction mixture was allowed to warm to room temperature and was then heated to the reflux temperature of about 76° C. Refluxing was continued for one hour. The solvent and volatile by-products were removed by distillation under reduced pressure, and the yellow-colored solid residue hydrolyzed by addition to 400 ml. of cracked ice. The crystalline product was removed by filtration and from the aqueous filtrate there was obtained a small additional amount of product by neutralization with aqueous sodium carbonate. The product was washed with water and dried to yield 3.1 gm. of alpha, alpha-dichloro-epsilon-caprolactam, melting point 122-125° C. (This corresponds to 11% conversion to the desired product.)

*Example 6*

To a stirred slurry of 93.7 gm. (0.45 mole) of $PCl_5$ in 50 ml. of $PCl_3$ maintained at −10° C. to −20° C. was slowly added over a period of 30 minutes, 17.0 gm. (0.15 mole) of dry cyclohexanone oxime. The mixture was then warmed to 30° C. during 15 minutes, whereupon 50 ml. of $POCl_3$ was added and the temperature raised to 87-88° C. in 30 minutes, and maintained there for an additional 90 minutes. The solvent was removed under reduced pressure and the residue hydrolyzed over ice, yielding, 21.9 gm. of crude alpha, alpha-dichloro-epsilon-caprolactam.

*Example 7*

The distillate from Example 4 comprising a mixture of $PCl_3$ and $POCl_3$ is treated with an equivalent amount of chlorine gas to convert the $PCl_3$ to $PCl_5$. To the mixture is then added cyclohexanone oxime in a ratio of about one mole of oxime to about three moles of $PCl_5$ while the temperature of the mixture is maintained below 35° C. The procedure of Example 4 is then followed to produce alpha, alpha-dichloro-epsilon-caprolactam.

Various changes and modifications of the invention can be made and, to the extent that such variations incorporate the spirit of this invention, they are intended to be included within the scope of the appended claims.

What is claimed is:

1. The process which comprises directly combining one mole of cyclohexanone oxime with at least three moles of a chlorinating agent in one step and reacting said oxime and chlorinating agent at a temperature above 50° C., and hydrolyzing the resulting product to form alpha, alpha-dichloro-epsilon-caprolactam.

2. The process which comprises reacting one mole of cyclohexanone oxime and at least three moles of $PCl_5$ in a member of the group consisting of $PCl_3$ and $POCl_3$ at a temperature above 50° C. to effect chlorination and hydrolyzing the reaction product to form alpha, alpha-dichloro-epsilon-caprolactam.

3. The process which comprises reacting one mole of cyclohexanone oxime and at least three moles of a chlorinating agent in a member of the group consisting of $PCl_3$ and $POCl_3$ at a temperature above 50° C. to effect chlorination and hydrolyzing the reaction product to form alpha, alpha-dichloro-epsilon-caprolactam.

4. The process which comprises directly combining one mole of cyclohexanone oxime with at least three moles of $PCl_5$ in one step and reacting said oxime and $PCl_5$ at a temperature above 50° C., and hydrolyzing the resulting product to form alpha, alpha-dichloro-epsilon-caprolactam.

5. The process of claim 4 in which the oxime is added to the $PCl_5$.

6. The process which comprises reacting one mole of cyclohexanone oxime and at least three moles of $PCl_5$ in $PCl_3$ at a temperature above 50° C. to effect chlorination, distilling off the solvent and volatile by-products including $PCl_3$ formed in the reaction to obtain a residue, and hydrolyzing the residue to form alpha, alpha-dichloro-epsilon-caprolactam.

7. The process which comprises combining cyclohexanone oxime and $PCl_5$, in the ratio of one mole of oxime to at least three moles of $PCl_5$, in a liquid reaction medium while maintaining the mixture at a temperature below 35° C., heating the mixture to a reaction temperature above 50° C., and hydrolyzing the resulting product to form alpha, alpha-dichloro-epsilon-caprolactam.

8. The process which comprises reacting one mole of cyclohexanone oxime and at least three moles of $PCl_5$ in $POCl_3$ at a temperature above 50° C. to effect chlorination, distilling off the reaction medium and volatile by-products including $POCl_3$, and hydrolyzing the residue to form alpha, alpha-dichloro-epsilon-caprolactam.

9. The process which comprises reacting one mole of cyclohexanone oxime and at least three moles of $PCl_5$ in $PCl_3$ at a temperature above 50° C., distilling off the solvent and volatile by-products including $PCl_3$ formed in the reaction to obtain a residue, hydrolyzing the residue to form alpha, alpha-dichloro-epsilon-caprolactam, reacting at least part of the distilled $PCl_3$ with chlorine to form $PCl_5$, recycling the $PCl_5$ so formed with additional $PCl_3$ and adding cyclohexanone oxime thereto to produce additional alpha, alpha-dichloro-epsilon-caprolactam.

10. The process which comprises reacting one mole of cyclohexanone oxime and at least three moles of $PCl_5$ in $POCl_3$ at a temperature above 50° C., distilling off the solvent and volatile by-products including $POCl_3$ and $PCl_3$ to obtain a residue, hydrolyzing the residue to form alpha, alpha-dichloro-epsilon-caprolactam, recycling at least part of the distilled $POCl_3$ and $PCl_3$, reacting the $PCl_3$ with chlorine to form $PCl_5$, recycling the $PCl_5$ so formed with $POCl_3$ and adding cyclohexanone oxime thereto to produce additional alpha, alpha-dichloro-epsilon-caprolactam.

11. The process which comprises mixing cyclohexanone oxime with a stoichiometric amount of a chlorinating agent in a liquid reaction medium maintained at a temperature below about 5° C., heating the mixture to a temperature above 50° C., distilling off the liquid reaction medium and volatile by-products, and hydrolyzing the residue to form alpha, alpha-dichloro-epsilon-caprolactam.

12. The process of claim 11 in which the chlorinating agent is $PCl_5$.

13. The process which comprises mixing one mole of cyclohexanone oxime with at least three moles of $PCl_5$ in $PCl_3$ maintained at a temperature below about 35° C., heating the mixture to a temperature above 50° C. and hydrolyzing the reaction product to form alpha, alpha-dichloro-epsilon-caprolactam.

14. The process which comprises mixing one mole of cyclohexanone oxime with at least three moles of $PCl_5$ and $PCl_3$ maintained at a temperature below about 5° C., adding $POCl_3$ to the mixture, heating the mixture to above 50° C. and hydrolyzing the reaction product to form alpha, alpha-dichloro-epsilon-caprolactam.

15. The process which comprises mixing one mole of cyclohexanone oxime with at least three moles of $PCl_5$ in $PCl_3$ maintained at a temperature below about 5° C., adding $POCl_3$ to the mixture, heating the mixture to above 50° C., distilling off the reaction medium and volatile by-products including $PCl_3$ and $POCl_3$, hydrolyzing the residue to form alpha, alpha-dichloro-epsilon-caprolactam, treating the distilled $PCl_3$ with chlorine to form $PCl_5$, recycling the $PCl_5$ so formed with additional $PCl_3$, mixing therewith additional cyclohexanone oxime at a temperature below about 5° C., and repeating the described process of making alpha, alpha-dichloro-epsilon-caprolactam.

16. The process which comprises mixing one mole of cyclohexanone oxime with at least three moles of $PCl_5$ in $PCl_3$ maintained at a temperature below about 5° C., adding $POCl_3$ to the mixture, heating the mixture to above 50° C., distilling off the reaction medium and volatile by-products including $PCl_3$ and $POCl_3$, hydrolyzing the residue to form alpha, alpha-dichloro-epsilon-caprolactam, recycling the distilled $POCl_3$ and adding it to a mixture of $PCl_5$ and cyclohexanone oxime in $PCl_3$ formed below about 5° C., and repeating the described process of making alpha, alpha-dichloro-epsilon-caprolactam.

References Cited in the file of this patent

FOREIGN PATENTS 748,542    Germany _____ Apr. 13, 1944